(12) United States Patent
Gass (10) Patent No.: US 10,722,959 B2
(45) Date of Patent: Jul. 28, 2020

(54) TABLE SAW

(71) Applicant: SD3, LLC, Tualatin, OR (US)

(72) Inventor: Stephen F. Gass, West Linn, OR (US)

(73) Assignee: SawStop Holding LLC, Tualatin, OR (US)

( * ) Notice: Subject to any disclaimer, the term of this patent is extended or adjusted under 35 U.S.C. 154(b) by 1 day.

(21) Appl. No.: 15/168,598

(22) Filed: May 31, 2016

(65) Prior Publication Data

US 2016/0346849 A1   Dec. 1, 2016

Related U.S. Application Data (60) Provisional application No. 62/169,386, filed on Jun. 1, 2015.

(51) Int. Cl.
*B23D 45/06* (2006.01)
*B27G 19/08* (2006.01)

(52) U.S. Cl.
CPC ........... *B23D 45/062* (2013.01); *B27G 19/08* (2013.01)

(58) Field of Classification Search
CPC .... B23D 45/062; B23D 59/003; B23D 45/06; B23D 33/02; B27B 27/08; B27G 19/08
USPC ........... 83/443, 468.3, 468.2, 485, 483, 471, 83/471.3, 477.2; 144/287
See application file for complete search history.

(56) References Cited

U.S. PATENT DOCUMENTS

| | | | |
|---|---|---|---|
| 2,265,407 A | 12/1941 | Tautz | |
| 2,974,693 A | 3/1961 | Goldschmidt et al. | |
| 3,115,166 A * | 12/1963 | Goldschmidt | B27B 5/243 83/433 |
| 4,249,442 A | 2/1981 | Fittery | |
| 4,516,612 A * | 5/1985 | Wiley | B23D 45/062 144/1.1 |
| 5,230,269 A | 7/1993 | Shiotani et al. | |
| 6,530,303 B1 * | 3/2003 | Parks | B23D 45/067 83/473 |
| 6,722,242 B2 | 4/2004 | Chuang | |
| 6,986,370 B1 | 1/2006 | Schoene et al. | |
| 6,994,004 B2 | 2/2006 | Gass et al. | |

(Continued)

FOREIGN PATENT DOCUMENTS

| | | | | |
|---|---|---|---|---|
| CA | 2330872 A1 * | 8/2001 | ........... | B23D 45/062 |
| EP | 1110650 A1 | 6/2001 | | |

(Continued)

OTHER PUBLICATIONS

SI16WA-WF Circular Saw with Tilting Blade Spare Parts Catalogue, SCMI Corporation, Norcross, GA, Nov. 1986 and 1991.

(Continued)

*Primary Examiner* — Kenneth E Peterson
*Assistant Examiner* — Nhat Chieu Q Do (57) ABSTRACT

Elevation and blade tilt mechanisms for table saws are disclosed. The elevation and tilt mechanisms may include an indexable position adjustment system configured to adjust the position of the blade relative to the table in discrete increments. Such table saws may also include a trunnion assembly with an elevation carriage slideably mounted to front and rear brackets, the brackets being tiltable with the elevation carriage relative to the table, and the elevation carriage being adapted to maintain the tilt of each bracket relative to the other bracket in a fixed orientation.

2 Claims, 9 Drawing Sheets

(56) References Cited

U.S. PATENT DOCUMENTS

| | | | |
|---|---|---|---|
| 7,350,444 | B2 | 4/2008 | Gass et al. |
| 7,707,920 | B2 | 5/2010 | Gass et al. |
| 7,827,893 | B2 | 11/2010 | Gass et al. |
| 9,555,491 | B2 | 1/2017 | Gass et al. |
| 9,844,891 | B2 | 12/2017 | Gass et al. |
| 2004/0226800 | A1 | 11/2004 | Pierga et al. |
| 2006/0201296 | A1* | 9/2006 | Kuo ............... B27B 27/08 83/435.12 |
| 2008/0289469 | A1* | 11/2008 | Chuang ............ B23D 45/068 83/473 |
| 2010/0005939 | A1 | 1/2010 | Burke et al. |
| 2010/0050843 | A1 | 3/2010 | Gass et al. |
| 2011/0041667 | A1* | 2/2011 | Chiang ............ B23D 45/062 83/477.1 |
| 2011/0146470 | A1 | 6/2011 | Lin |
| 2012/0006171 | A1 | 1/2012 | Liu |
| 2012/0204688 | A1* | 8/2012 | Rowe ............... B23D 45/062 83/13 |
| 2014/0260869 | A1 | 9/2014 | Frolov |

FOREIGN PATENT DOCUMENTS

| WO | WO 01/26064 A2 | 4/2001 |
|---|---|---|
| WO | WO 10/059786 A1 | 5/2010 |

OTHER PUBLICATIONS

Whirlwind Model 212 Cut-Off Saw Owner's Manual, Whirlwind, Inc., Apr. 1991.
Inca 2100SE Professional Tablesaw Owners Manual, Injecta Machinery, 1992.
Inca 2200 Table Saw Photo of Internal Mechanisms, around 1992.
Whirlwind Model 212 Semi-Automatic Cut-Off Saw Brochure, Whirlwind, Inc., Jan. 1993.
Skil Model 3400—Type 1 10" Table Saw Parts List and Technical Bulletin, S-B Power Tool Company, Jun. 1993.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Altendorf publication, Wilhelm Altendorf GmbH & Co. KG, Minden, Germany, 1999.
Grizzly Industrial, Inc. Heavy-Duty 12" Table Saw Model G5959 and G9957 Parts List, 1998 and Oct. 2001.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
Ryobi 10" Table Saw BT3000 Operator's Manual, Ryobi Technologies, Inc., Mar. 2001.
SC 3W Circular Saw Manual, SCM Group S.p.A Divisione Minimax—Samco, Feb. 2001.
Bosch 10" Table Saw Model 0601476139 Parts List and Technical Bulletin, S-B Power Tool Company, Apr. 2001.
SI450E Circular with Tilting Blade Spare Parts Catalogue, SCM, Apr. 26, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI300S4 Circular with Tilting Blade Spare Parts Catalogue, SCM, Oct. 30, 2003.
Craftsman® Power and Hand Tools, pp. 142-143, 2003.
The Legendary Shopsmith Mark V ad, Shopsmith, Inc., at least as early as Jan. 14, 2004.
Powermatic WMH Tool Group Operating Instructions and Parts Manual 10-inch Cabinet Saw Model 2000, Nov. 2005.
Makita Model 2704 Exploded Drawings and Parts List, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
DW745 Type 1 Table Saw Parts List, DeWalt Industrial Tool Co., 2005.
Grizzly Industrial, Inc. Model G0605X/G0606X Extreme Series 12" Table Saw Owner's Manual, Grizzly Industrial, Inc., Oct. 2006.
DW745 Heavy-Duty 10" Job Site Table Saw Manual, DeWalt Industrial Tool Co., 2006.
C10RB Jobsite Table Saw Manual, Hitachi Koki USA Ltd., 2006.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Grizzly Industrial, Inc. Model G0651/G0652 10" Extreme Series Table Saws Owner's Manual, Grizzly Industrial, Inc., Mar. 2008.
Bosch 4100 Table Saw Manual, Robert Bosch Tool Corporation, May 2008.
SawStop 10" Industrial Cabinet Saw Owner's Manual, SawStop, LLC, Oct. 2008.
General Model 50-300/305 MI, 50-300CE/305CE Setup and Operation Manual, General International, Jul. 2009.
JET XACTA Saw Deluxe Operating Instructions and Parts Manual, JET/Walter Meier Manufacturing Inc., Dec. 2009.
Delta 10" Left Tilting Unisaw Instruction Manual, Delta Machinery, Jan. 2010.
General Model 502-70 Setup and Operation Manual, General International, Mar. 2010.
SawStop 10" Contractor Saw Owner's Manual, SawStop, LLC, May 2010.
General Model 50-200R Setup and Operation Manual, General International, Sep. 2010.
SawStop Model PCS175 10" Professional Cabinet Saw Owner's Manual, SawStop, LLC, Nov. 2012.
Dewalt Models DWE7490, DWE7491 Instruction Manual, Dewalt Industrial Tool Co., 2013.
Makita Table Saw 2704 Instruction Manual, Makita Corporation of America, date unknown.
SCM SI 450 Circular saw with tilting blade product brochure, Villa Verucchio, Italy, undated.
SCM Group publication, Rimini, Italy, undated.
Laguna Tools table saw owner's manual, date unknown.
Speed Reducer Self-Locking and Back-Driving, SE Encore, date unknown.
Engineering Considerations and Terminology, American Linear Manufacturers, date unknown.
Worm Gears, Martin, date unknown.

\* cited by examiner

Fig. 10
0 Degrees Bevel

Fig. 11
0.5 degrees

Fig. 12
1 degree

Fig. 13
1.5 degrees

TABLE SAW

CROSS-REFERENCE TO RELATED APPLICATION

This application claims the benefit of and priority from U.S. Provisional Patent Application Ser. No. 62/169,386, filed Jun. 1, 2015, which is incorporated herein by reference.

FIELD

The present disclosure relates to power tools and particularly to power tools with tool positioning mechanisms.

BACKGROUND

Power tools often include some type of elevation mechanism to adjust the height or position of a cutter. In a table saw, for example, an elevation mechanism allows the height of the blade to be adjusted and a tilt mechanism allows the angle/tilt of the blade to be adjusted. These mechanisms should be easy to use and economical. Prior systems suffer from being difficult to adjust or unnecessarily complex.

DETAILED DESCRIPTION

Figure 1:
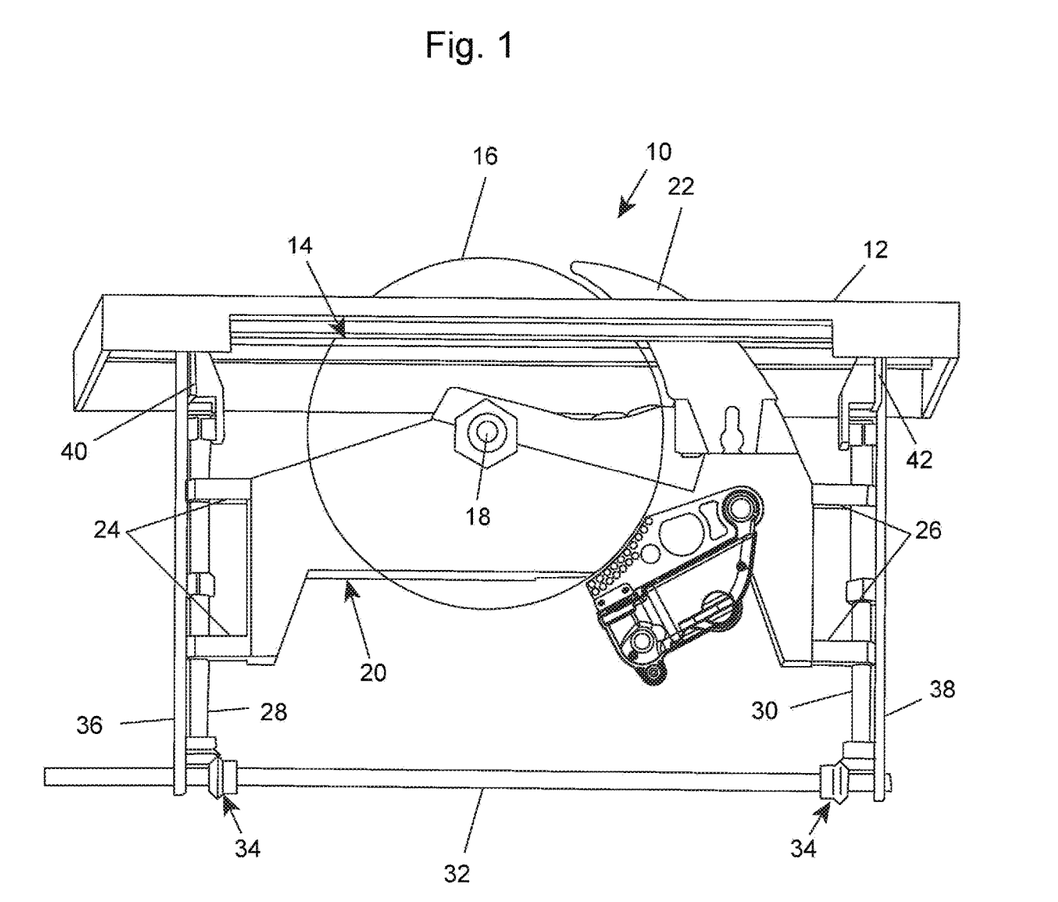
FIG. 1 shows a table saw with an elevation mechanism.
Figure 7:
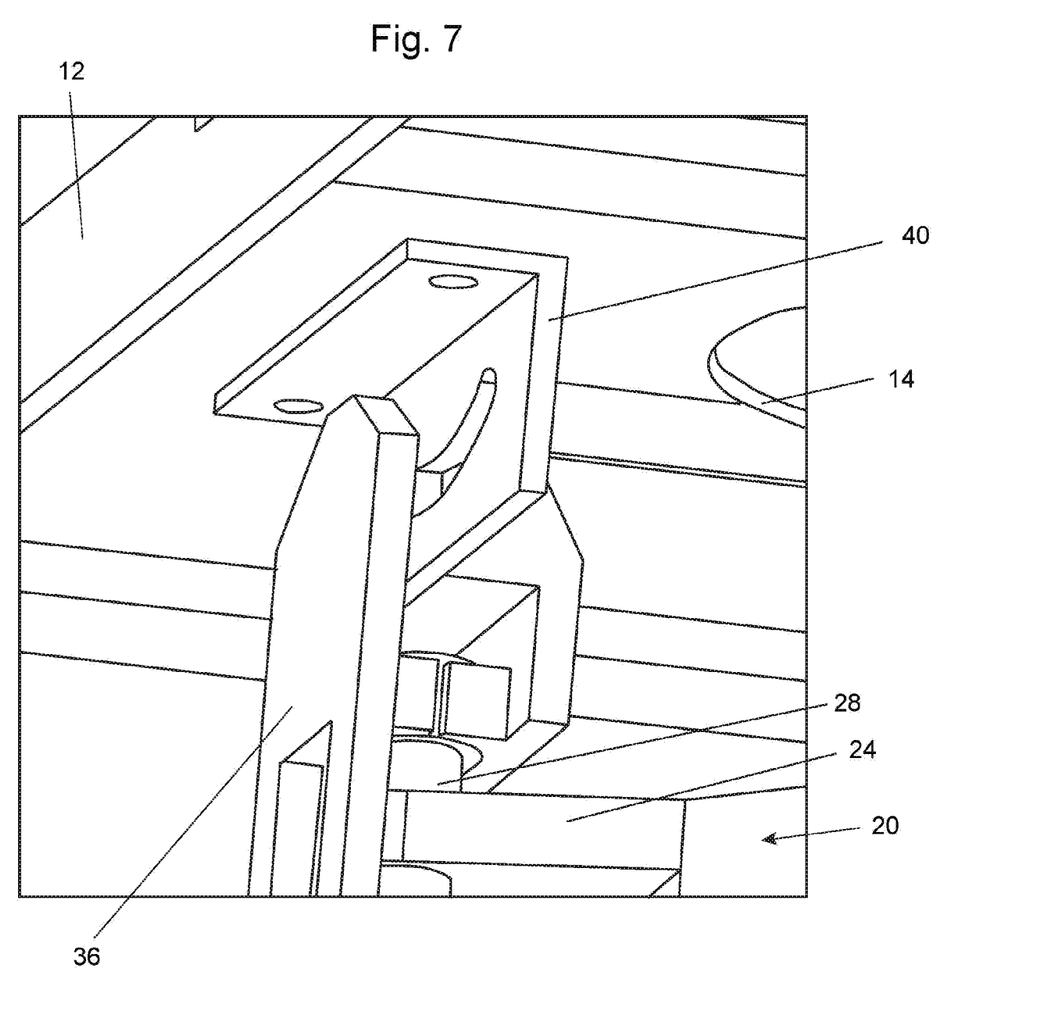
FIG. 7 shows tilt a tilt plate connection.

FIG. 1 shows a table saw 10 having a table 12 with an opening 14 and a blade 16 projecting through opening 14. Blade 16 is supported on an arbor 18 mounted in an elevation carriage 20. A riving knife 22 is also mounted to elevation carriage 20. Elevation carriage 20 has front and rear support arms 24, 26 that threadedly engage on front and rear threaded shafts 28, 30. Rotation of shafts 28, 30 by elevation control shaft 32 via miter gears 34 causes elevation carriage 20 to move up and down shafts 28, 30. Shafts 28, 30 are supported by front and rear brackets 36, 38 respectively. Brackets 36, 38 are pivotally connected to table 12 via tilt plates 40, 42, respectively, which allow elevation carriage 20 (and thereby blade 16) to tilt relative to table 12. Representative tilt plate 40 is shown in more detail in FIG. 7. Tilt plates 40 and 42, elevation carriage 20, support arms 24, 26, shafts 28, 30, elevation control shaft 32, miter gears 34, and brackets 36, 38 comprise an example of a trunnion assembly, shown generally at 43 in FIG. 1.

It should be noted that in saw 10 tilting torque is transferred directly through elevation carriage 20 rather than though a separate trunnion link as is found in prior art saws. This provides a simpler structure by avoiding the need for a rigid trunnion link assembly or member.

Figure 2:
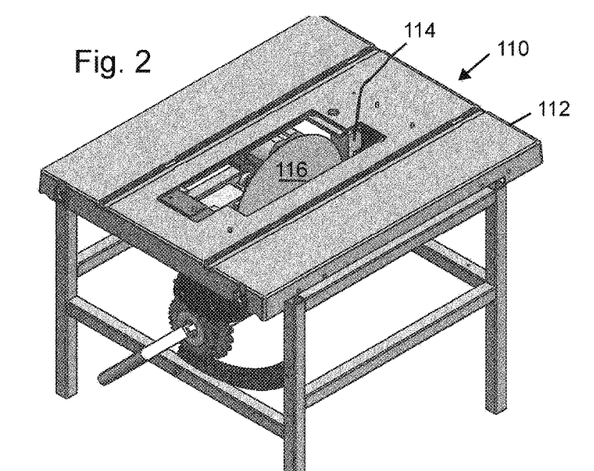
FIGS. 2-4 show a table saw with an indexable elevation mechanism.
Figure 3:
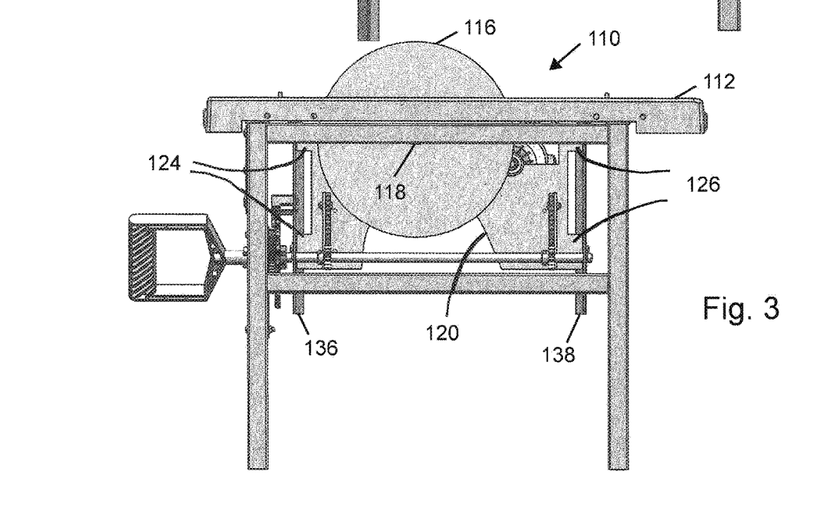
Figure 4:
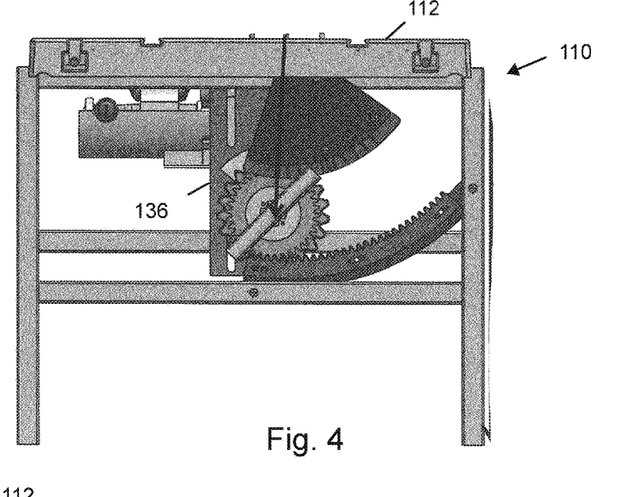

FIGS. 2-4 shows a saw 110 having a table 112 with an opening 114 and a blade 116 projecting through opening 114. Blade 116 is supported on an arbor 118 mounted in an elevation carriage 120. Elevation carriage 120 has front and rear support arms 124, 126 that slideably engage front and rear brackets 136, 138, respectively. Brackets 136, 138 are pivotally connected to table 112 via tilt plates like tilt plates 40 and 42, which allow elevation carriage 120 (and thereby blade 16) to tilt relative to table 112.

Elevation carriage 120 is driven up and down on brackets 136, 138 by the interaction of front and rear elevation pinions 144, 146 with front and rear racks 168, 170 secured to elevation carriage 120. Elevation pinions 144, 146 are mounted to elevation control shaft 132. Rotating elevation control shaft 132 with elevation handle 152 drives elevation carriage 120 up and down brackets, such as bracket 148, to control the elevation of blade 116 through opening 114. A strap, chain or other similar member wrapped around elevation shaft 132 or crank arm attached thereto, could likewise be used to convert rotational movement of elevation shaft to vertical displacement of elevation carriage 120. Although elevation carriage 120 is shown with the direct torque transfer configuration illustrated in FIG. 1, the elevation mechanism is equally applicable to more traditionally constructed trunnion or elevation assemblies.

Figures 5, 6:
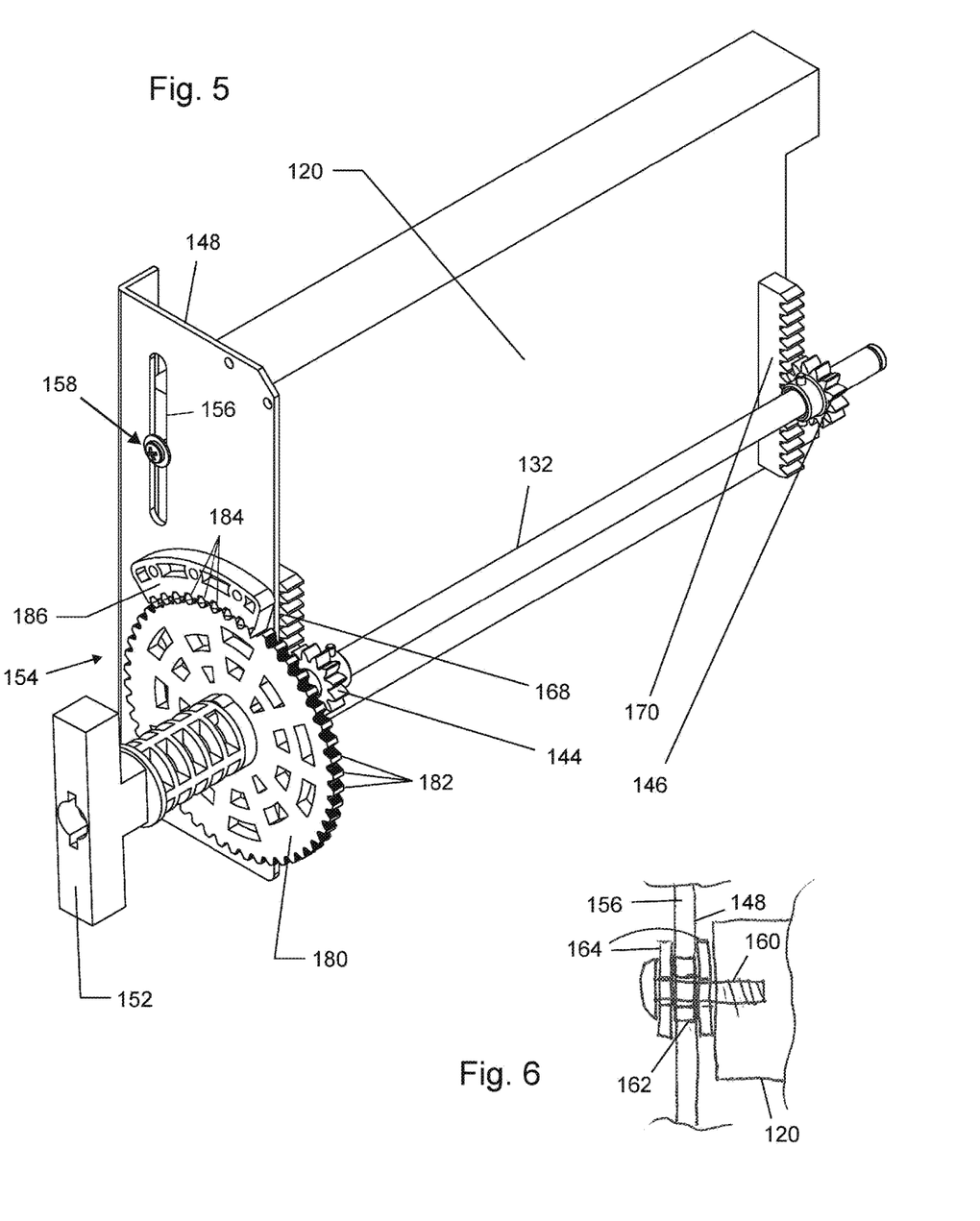
FIG. 5 shows a detailed view of an indexable elevation mechanism.
FIG. 6 shows a sectional view of a sliding connection between an elevation carriage and a bracket.

FIG. 5 illustrates bracket 148 in more detail with the addition of an indexable control 154 for elevation control shaft 132. Bracket 148 includes guide two slots 156 (the lower one being obscured by the indexable control). A guide assembly 158 is secured to elevation carriage 120 and rides in each slot 156. As shown in FIG. 6, each guide assembly includes a screw 160, a bushing 162 and washers 164 to provide structure to slideably retain elevation carriage 120 to bracket 148. Guide assemblies 158 are preferably a relatively close fit in slots 156 to provide accurate and slop free linear motion of elevation carriage 120 on brackets 148, 150. The two point connection between elevation carriage 120 and brackets 148, 150 insures that both brackets and the carriage are maintained in alignment as the carriage tilts or the blade is raised and lowered. Notably, this alignment between the front and rear brackets is maintained without the need for a trunnion link separate from the elevation carriage. Elevation carriage 120 may also be thought of as a unified trunnion/elevation carriage since it serves the purpose of the trunnion link as well as the elevation carriage.

Figure 8:
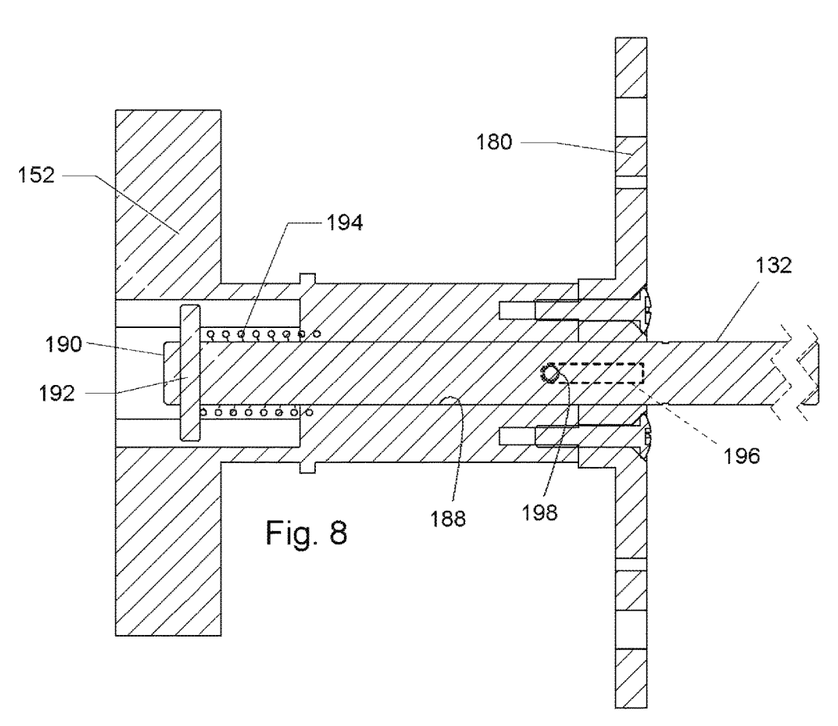
FIGS. 8 and 9 show sectional detailed views of an indexable elevation mechanism.
Figure 9:
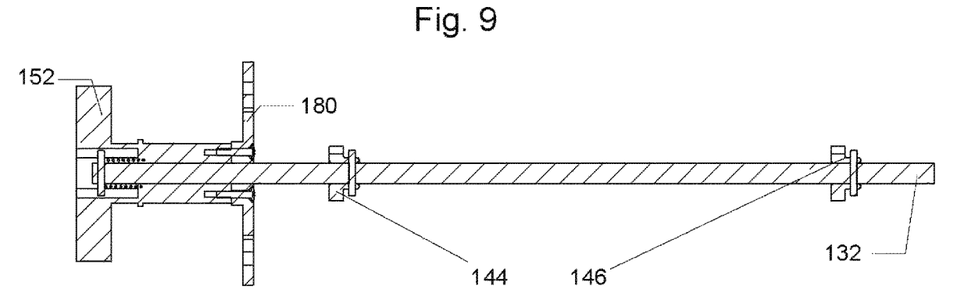
Figure 10:
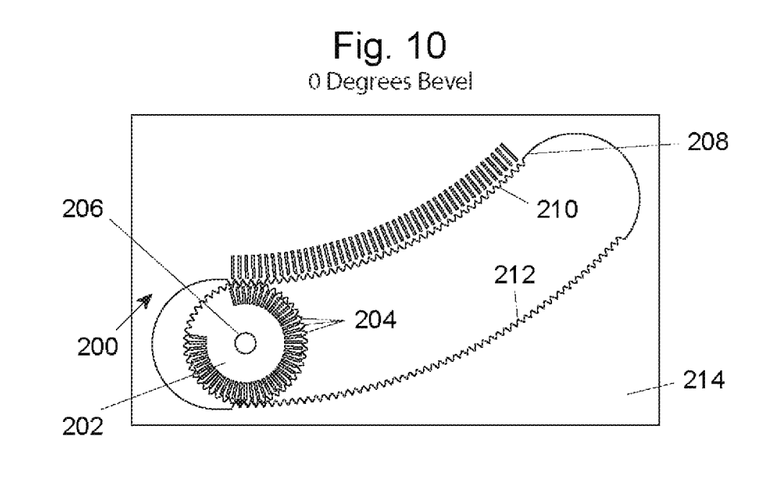
FIGS. 10-13 show an indexable tilt system.
Figure 11:
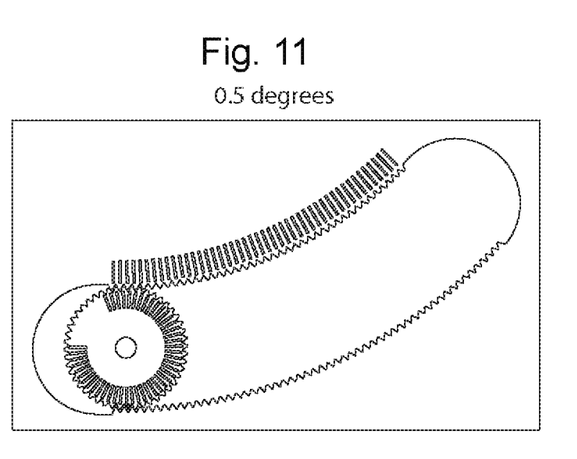
Figure 12:
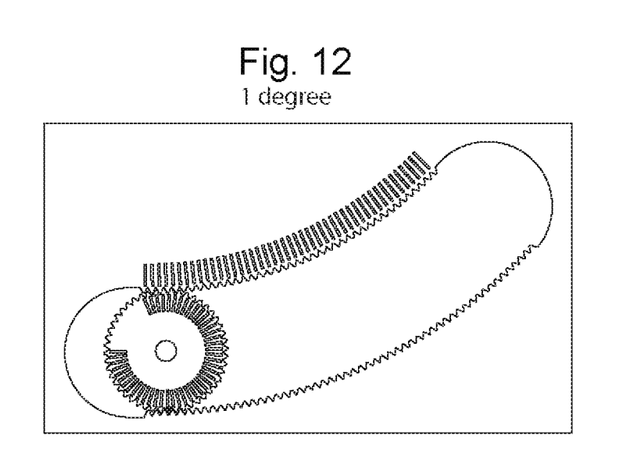
Figure 13:
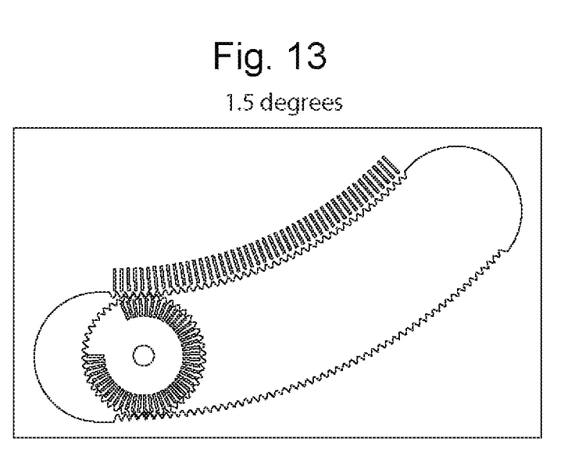

Indexable control 154 shown in FIG. 5 includes an indexing gear 180 connected to handle 152 and adapted to rotate with shaft 132. Indexing gear 180 includes teeth 182 disposed around the perimeter adapted to selectively mesh with teeth 184 formed on indexing rack 186. Handle 152 and gear 180 are secured together and slideably mounted on shaft 132 as shown in FIGS. 8 and 9. More particularly, handle 152 has a central bore 188 that fits slideably over shaft 132 and is held in place by a screw 190, washer 192 and spring 194 at one end and a cross pin 198 fixed through shaft 132 ridding in a slot-like pocket 196.

When handle 152 is pulled to the left (out from the front of the saw), spring 194 is compressed as pin 198 slides in slot 196. The limited compression of spring 194 prevents pin 198 from coming out of slot 196. As a result, the handle remains rotatably coupled to shaft 132 to rotate pinions 144, 146 and selectively raise and lower the blade. When the handle is pulled to the left, it disengages the teeth of gear 180 and rack 186, allowing the handle to be rotated. When the handle is released, spring 194 pushes gear 180 back into engagement with rack 186. This prevents the elevation carriage from falling under its own weight and backdriving pinions 144, 146. In addition, in the pictured embodiment, the finite pitch of teeth 184, 182 only allows the elevation shaft to lock at indexed locations. The pitch of the teeth in conjunction with the diameter of the pinions will result in a specific blade elevation change per tooth. Typical dimensions are chosen to generate an incremental elevation change of approximately $\frac{1}{32}^{nd}$ of an inch and full up to full down elevation change with a single revolution. Other values are equally within the scope of the invention and the specifics are chosen based on the desired operating characteristics of the saw. For instance, it may be desirable in some applications to have finer elevation adjustments and or more or less handle turns to raise or lower the blade. Alternatively, gear and rack could be replaced with corresponding untoothed components that locked by frictional engagement, such as a taper lock, to eliminate the indexing feature while still allowing fast and simple elevation adjustment. It should also be understood that gear 180 could be replaced with a single pointer that engaged teeth on rack 186—although this might require rack 186 to be extended to allow a greater range of elevation adjustment. Similarly, rack 186 could be replaced with a single point that could selectively engage gear 180.

A similar indexing control 200 is shown in FIGS. 10-13 and adapted to selectively set the tilt of the blade relative to the table at discrete locations. In particular, indexing control 200 includes a tilt indexing gear 202 with teeth 204 distributed around the perimeter. A central bore 206 fits over the elevation shaft (not shown) so that gear 202 can rotate independently of the elevation shaft. Gear 202 fits into an arcuate slot 208 between an upper rack 210 and a lower rack 212. Slot 208 and racks 210, 212 are preferably molded in a plastic housing 214 forming part of the enclosure of the saw. One of racks 210, 212 is displaced forward or rearward relative to the other so that gear 202 can be shifted forward or back to selectively engage one or both racks.

It can be seen that with gear 202 engaged in both racks, it is not possible to tilt the blade due to the engagement of teeth 204 with racks 210, 212 preventing the gear from either rotating in or translating along the slot. However, by shifting gear 202 forward or back to disengage one of the racks, such as by pushing or pulling on a handle connected to the gear, it is then possible to tilt the blade since gear 202 would be free to rotate and move in slot 208. By correct choice of arc radii, tooth pitch and gear diameter it is possible to have engagement of gear 202 in the racks only occur at predetermined angular intervals. In the illustrated embodiment, displacement of the teeth of gear 202 by one tooth in lower rack 212 will cause a ½ degree tilt of blade. This incremental transition is shown sequentially for 0 to 1.5 degrees of tilt in FIGS. 10-13.

Figure 14:
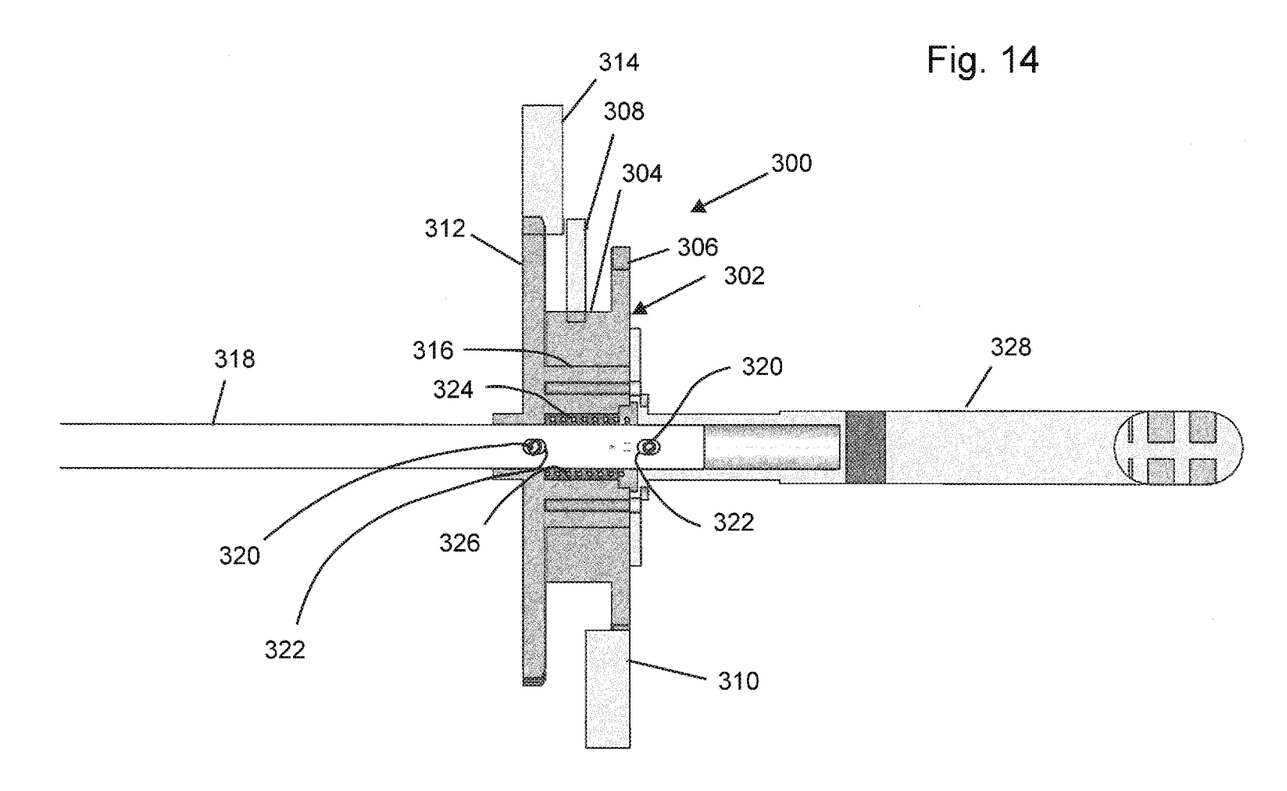
FIGS. 14-16 show an alternative indexable tilt system with enhanced index resolution.
Figure 15:
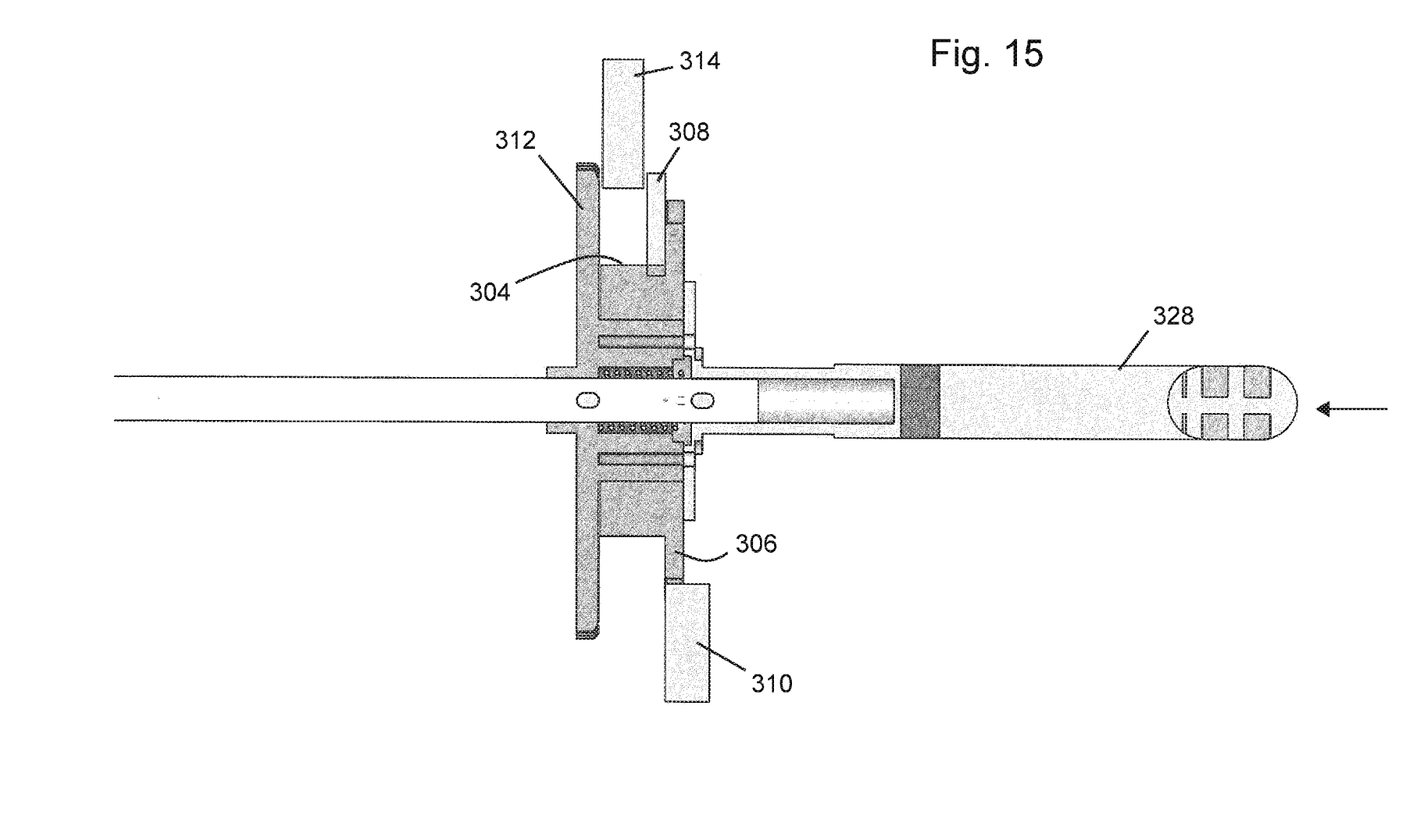
Figure 16:
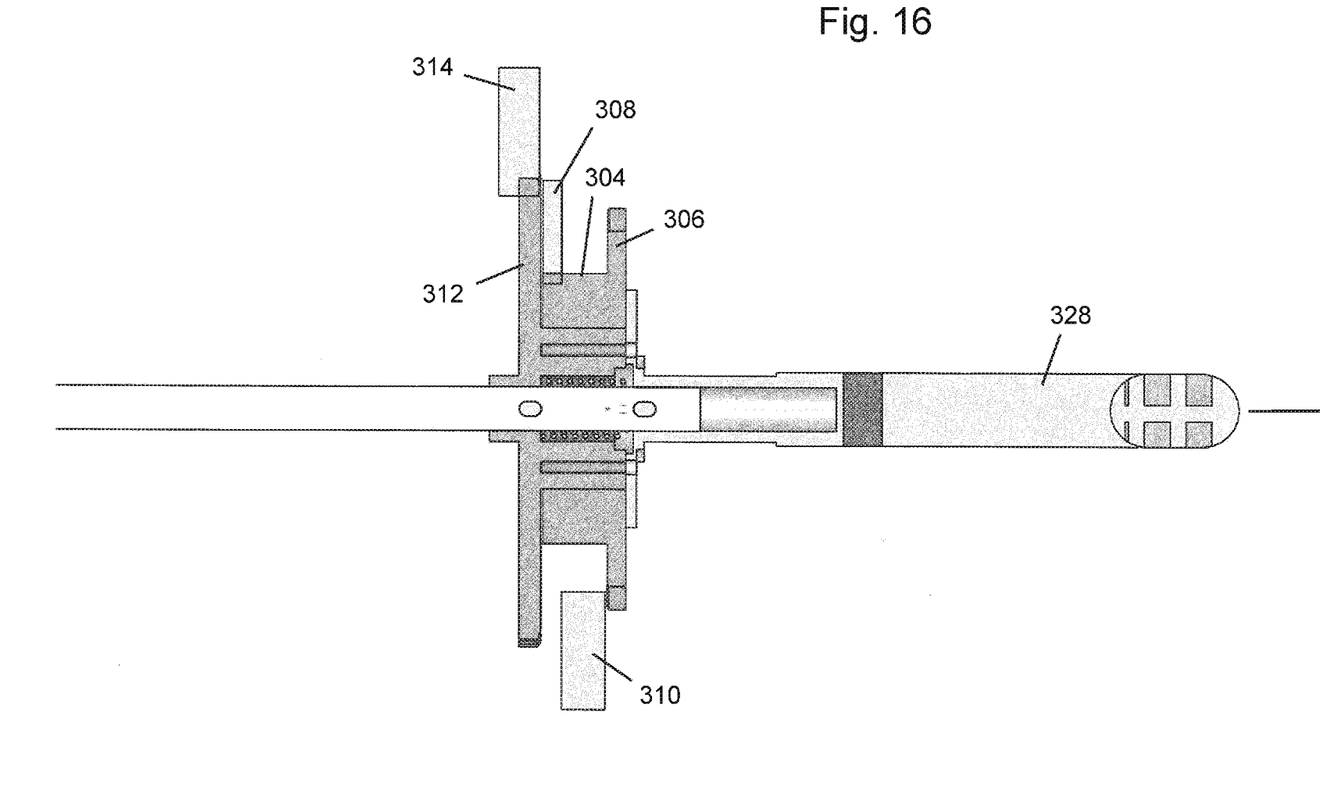

An alternate embodiment of an indexing control system is shown at 300 in FIGS. 14-16. Control 300 includes a stepped tilt indexing gear 302. Gear 302 includes a small gear 304 and a large gear 306 secured to rotate together. Small gear 304 is positioned to interact with upper arc 308 while large gear 306 selectively meshes with lower arc 310. The offset of the upper and lower arcs described above can be readily seen. Control 300 also includes an elevation positioning gear 312 and a corresponding rack 314. Elevation positioning gear 312 includes a hub 316. Stepped gear 302 fits over hub 316, and is thereby supported by the hub while gear 302 remains free to rotate around the hub.

Hub 316 is slideably mounted to an elevation shaft 318 and positioned by two pins 320 press fit into holes 322 formed in shaft 318. A spring 324 is captured between the pins and fits in cavity 326. The ends of cavity 326 are sized to allow shaft 318 to slide but catch spring 324. As a result, if a handle 328 which is secured to the hub is pulled or pushed, spring 324 is compressed, but allows the assembly to slide back and forth by a small amount. The spring also restores the assembly to a neutral position (shown in FIG. 14) when the handle is released.

When the indexing control is positioned as shown in FIG. 14, both the tilt and elevation are locked because small gear 304 meshes with upper arc 308, large gear 306 meshes with lower arc 310 and gear 312 meshes with rack 314. When handle 328 is pushed in (to the left as shown in FIG. 15) elevation positioning gear 312 is disengaged from rack 314 allowing handle 328 to be rotated to raise and lower the blade, while gears 304, 306 still mesh with arcs 308, 310 locking the tilt of the blade in place. If, on the other hand, handle 328 is pulled out, as depicted in FIG. 16, elevation positioning gear 312 remains engaged with rack 314, but large gear 306 comes disengaged from rack 310, which allows the blade to tilt by rolling of small gear 304 on rack 308. The blade can be tilted by simply moving the handle to one side or the other without rotating the handle. On first inspection, this is very similar to the system of FIGS. 10-13, however, the use of a step gear causes the indexing to occur at smaller intervals for a given tooth size and arc radius. This is advantageous to provide the ability to set the tilt in finer increments and/or to allow for the use of larger teeth which may reengage more easily or be more robust.

It can be seen that the indexing control system of FIG. 14-16 provides the advantage of a single handle and one handed control of both tilt and elevation in a table saw. There is no need to release a clamp or other mechanism to release the system to tilt or elevate the blade. The system is nonetheless robustly held in place when the handle is not pushed or pulled. The system is also very mechanically simple and economical to construct.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:
1. A table saw comprising:
a table;
a trunnion assembly disposed beneath the table; and
a blade supported by the trunnion assembly;

where the trunnion assembly includes an elevation mechanism configured to position the blade at various elevations relative to the table, a tilt mechanism configured to tilt the blade at various angles relative to the table, and an indexable position adjustment system, and a single shaft is configured to be moved by a user to change the elevation and tilt of the blade, wherein the indexable position adjustment system includes a first locking member mounted on the trunnion assembly or the table and a second locking member mounted on the single shaft, one of the first and second locking members includes a plurality of discrete increment recesses, wherein the second locking member moveably engages with the first locking member at one of the discrete increment recesses to lock the elevation and the tilt of the blade relative to the table at indexed locations and in discrete increments.

2. The table saw of claim 1 wherein the elevation mechanism includes an elevation carriage slideably mounted to front and rear brackets, the brackets being tiltable with the elevation carriage relative to the table and where the elevation carriage is adapted to maintain the tilt of each bracket relative to the other bracket in a fixed orientation.

* * * * *